United States Patent [19]
Tull

[11] 3,821,341
[45] June 28, 1974

[54] MOLDED FOAM DECORATIVE DEVICES AND PROCESS FOR MANUFACTURE THEREOF

[76] Inventor: Russell F. Tull, 2081 Kendal Ave., Victoria, British Columbia, Canada

[22] Filed: Nov. 1, 1971

[21] Appl. No.: 194,710

Related U.S. Application Data

[63] Continuation-in-part of Ser. No. 595,513, Nov. 19, 1966, abandoned, and a continuation of Ser. No. 808,099, March 18, 1969, abandoned.

[52] U.S. Cl. .............. 264/51, 264/45, 264/48, 264/52, 264/53, 264/DIG. 14
[51] Int. Cl. .............................................. B29d 9/00
[58] Field of Search ............ 264/45, 48, 51, 52, 53, 264/321, DIG. 14

[56] References Cited
UNITED STATES PATENTS

| | | | |
|---|---|---|---|
| 2,898,632 | 8/1959 | Irwin et al. | 264/48 |
| 3,054,146 | 9/1962 | Griffin | 264/321 |
| 3,099,516 | 7/1963 | Henrickson | 264/53 |
| 3,170,974 | 2/1965 | Jacobs | 264/321 |
| 3,381,076 | 4/1968 | Govatsos | 264/52 |
| 3,399,106 | 8/1968 | Palmer et al. | 264/51 |
| 3,449,477 | 6/1969 | Logomasini | 264/45 |

OTHER PUBLICATIONS

Knox & Stengand, Molding Rigid Urethane Foam (A DuPont article), October 1960, pages 8–9.

*Primary Examiner*—Donald E. Czaja
*Assistant Examiner*—Ronald W. Griffin

[57] ABSTRACT

A decorative device for application to a surface to be decorated and a method for making same. The device is made of an expanded plastic material having a decorative surface and a supporting surface. The decorative surface is of greater density and smoother than the supporting surface. The greater density and smoothness of the decorative surface is provided by the method of forming.

In one form of the invention the decorative device is molded in the desired form, the mold producing a relatively dense decorative surface, whereas the supporting surface is relatively open pored.

5 Claims, 4 Drawing Figures

MOLDED FOAM DECORATIVE DEVICES AND PROCESS FOR MANUFACTURE THEREOF

This application is a continuation-in-part of my application Ser. No. 595,513, filed Nov. 19, 1966, now abandoned, and a continuation of my application Ser. No. 808,099, filed Mar. 18, 1969, now abandoned.

This invention relates to articles of rigid expanded synthetic plastic materials and to a process for the manufacture thereof.

Synthetic plastic materials have been substituted for naturally occurring conventional materials in many instances. However, hitherto such materials have had a disadvantage over the conventional materials since it was not possible to form them with a surface which was sufficiently homogeneous and smooth to be aesthetically satisfying. Thus rigid expanded foam materials, such as expanded polystyrene, have been limited to uses such as packaging since their surface was pitted or cracked or otherwise unsmooth. However, the material itself is of a light-weight, impact-resistant, strong, rigid nature and could find a large number of uses. The present invention provides, as a new article of manufacture, an improved expanded foam synthetic material article and a process for the manufacture thereof.

According to the invention there is provided, as a new article of manufacture, an integral molded article of rigid expanded synthetic plastic material having a part of its surface region of greater density than the density of the remainder of the article. Preferably, the said part of greater density extends a substantial depth into the article, e.g., of the order of one-tenth of the average thickness of the article.

A particular form of the invention is an elongated decorative device for attaching to an interior surface of a room, said device having a surface region of greater density which is adapted to face into the room.

The invention also provides a process of manufacturing an article from synthetic plastic material comprising preheating a mold having a molding cavity, introducing expandable pellets of said material into said molding cavity, further heating at least one side of said mold so as to raise the temperature of said one side above the temperature of the other side and to expand said material, whereby, in the finished article, there is a surface region remote from said one side during manufacture which has a greater density than the remainder of said article.

A material which is particularly suitable for use in the invention is polystyrene.

The article of the invention has a surface which is smooth, homogeneous, resistant to impact and fracture and capable of receiving and retaining a coating of paint or other substance. An article which is painted and applied to a room or for other purposes has an aesthetically satisfying appearance.

Various aspects of the invention will now be described by way of example with reference to the accompanying drawings in which.

Figure 1:
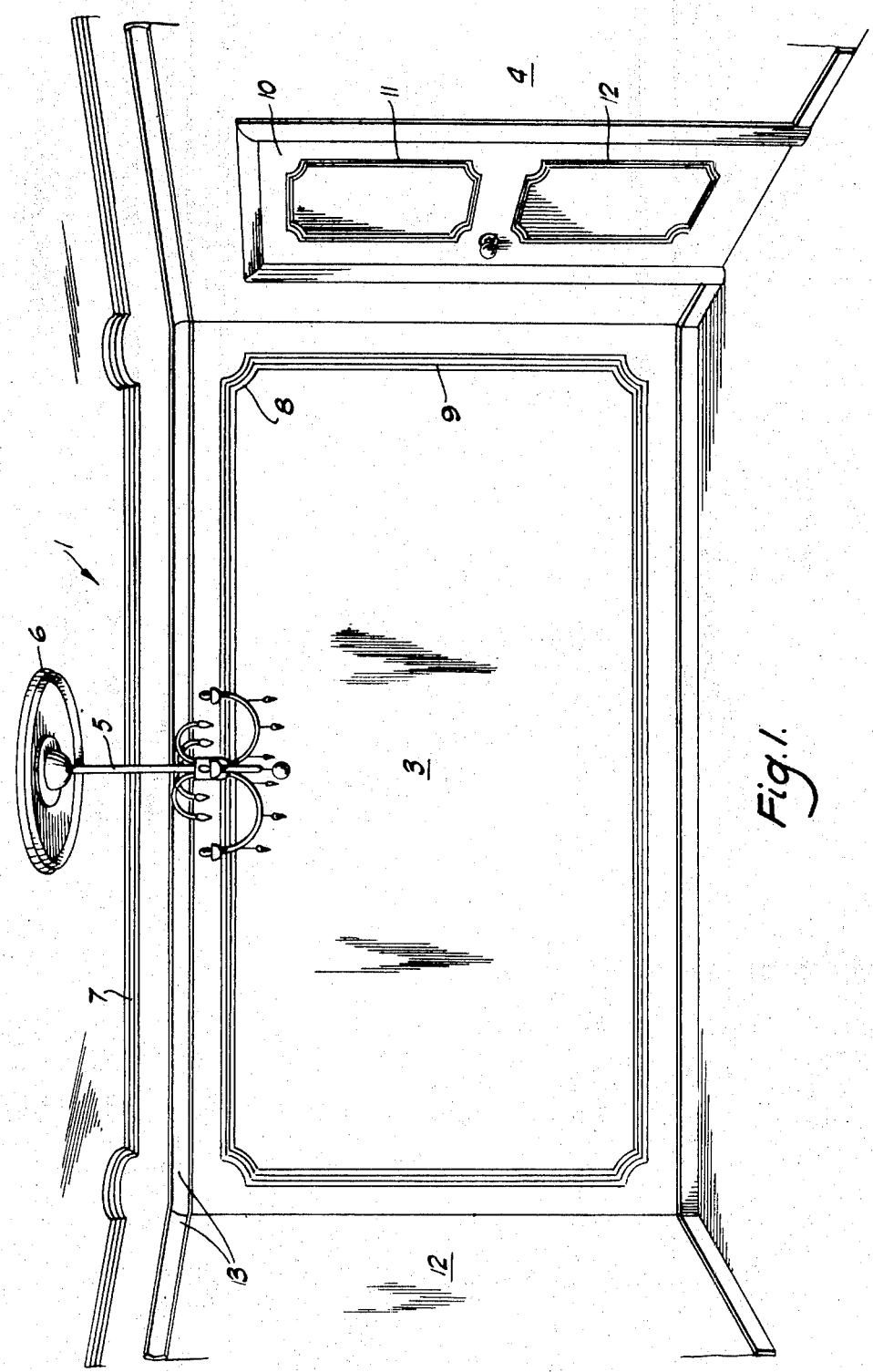
FIG. 1 illustrates the interior of a room showing one use of the article according to the invention.

Referring now to FIG. 1, there is shown a room having a ceiling 1 and side walls 2, 3, and 4. The ceiling is provided with a chandelier 5 having an accent ring 6 positioned therearound. The room also includes a plurality of cornice molds 13 and a ceiling mold 7. On the wall 3 is a decorative molding composed of a corner mold 8 and a straight mold 9. In addition, the door 10, positioned in the wall 4, includes decorative moldings 11 and 12 thereon.

Figure 2:
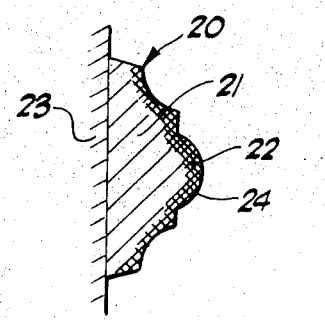
FIG. 2 is a diagrammatic cross section of a decorative device attached to a wall.

The various moldings 6, 7, 8, 9, 11, 12 and 13 are typical articles according to the invention. A section through a typical molding 20 is shown in FIG. 2. The molding 20 may be attached to a wall 23 by applying a chemically compatible adhesive to the wall and the undersurface of the molding and firmly pressing the one against the other. As may be seen from the illustration, the molding is substantially homogeneous across its whole section except for the surface region facing out into the room. The surface region 22 extends a substantial depth into the molding, something of the order of one-tenth of the average thickness of the molding. In spite of the substantial discontinuity in density between the portions 21 and 22 of the molding, the molding is monolithic and there is no structural weakness between the two portions. By virtue of the increased density of the portion 22, the surface 24 is of a smooth continuous nature. This allows the application of paint and other coloring matter. The aesthetic effect of the molding is satisfactory. A preferred material for such a device is expanded polystyrene which is substantially rigid, is of very light weight, and is not liable to fracture under a light blow.

The use of wooden and plaster-of-paris and other molded accents and decorative devices for walls or ceilings is well known and has been common for many years. Decorative devices of this type are bulky and require skilled artisans for installation. They are not easily removable and their removal requires extensive renovation. As a result, such room accents are rarely changed and normally are utilized for many years longer than might be desirable, due to the high cost of replacing them. Furthermore, it is difficult to obtain a carved or scrolled effect in wooden or plaster-of-paris wall accents.

The decorative device described above which is typical of the usefulness of articles with which the present invention is concerned, is readily manufactured by the molding of expandable synthetic plastic materials such as polystyrene. By the process of the invention which will be described below, the molding can be readily provided with a dense surface region so as to provide a smooth finish; also carved or scrolled effects are readily obtainable. The foam material is of very low density and is, therefore, very easy to handle. The material is also easily glued, such as by mastic or other well known glues, and can therefore be painted or decorated apart from the wall on which it is positioned. A wall decoration of the type described above can be used and installed safely and inexpensively and does not require skilled artisans for installation. The decorative device of the invention is also readily removable and can, therefore, be used as a temporary as well as a permanent decorative device, such removal is inexpensive and practical. The above described decorative devices can be installed subsequent to the painting of walls and the like and therefore lends wall painting to the highly efficient use of rollers, since painting can then be done on a flat wall with the subsequent installation of the moldings. This saves a great deal of time and labor cost by eliminating the requirements of close brush work or the required use of highly experienced and skilled decorators to properly paint the moldings subsequent to painting of the remainder of the wall surface. Furthermore, the expanded foam material is more flexible than wooden or plaster-of-paris materials and the molding can therefore adapt itself to imperfections in wall alignment and can also be bent in large arcs of curvature which has not hitherto been possible.

The moldings may be of the natural color of the polystyrene or other material used or a dye may be incorporated during manufacture. Also, the moldings may be sold unpainted for the do-it-yourself decorator or they may be professionally painted prior to sale. With wooden or plaster-of-paris moldings it was impossible to color the material used and if, therefore, part of the molding should be chipped away, an ugly contrasting blemish was left.

Although the invention has largely been described with reference to wall moldings for the interior of a room, it is able to withstand severe climatic conditions and can be used on exterior surfaces also. It will be understood that the article according to the invention, having a superior dense surface region which provides a smooth superficial surface, can be used for many other purposes, such as packaging, where an aesthetically pleasing appearance is desired.

Manufacture of the articles will now be explained.

Figure 3:
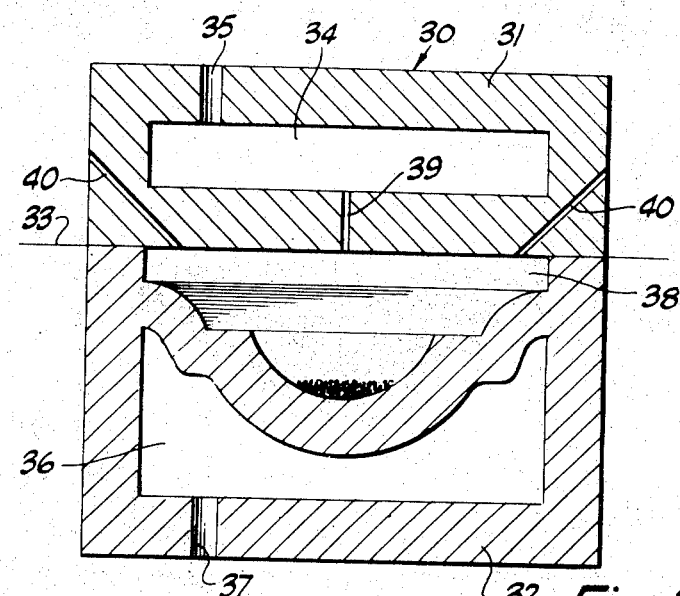
FIGS. 3 and 4 are cross sections of a mold for the manufacture of the article illustrated in FIGS. 1 and 2 and show the process of the invention.
Figure 4:
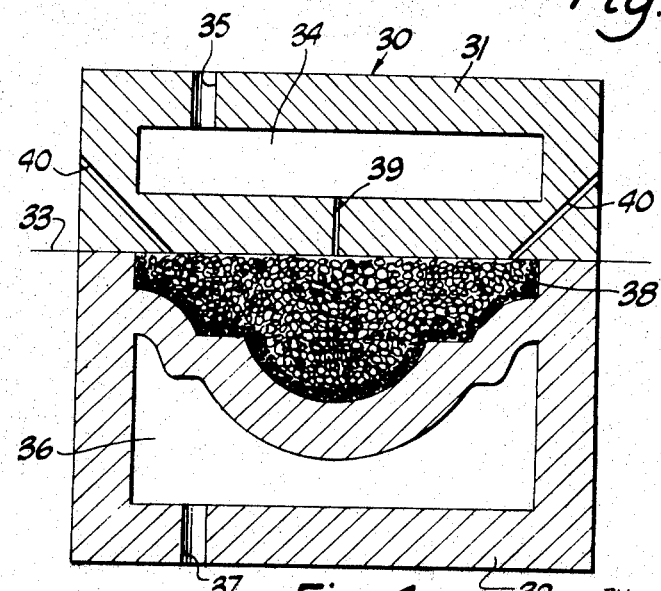

FIGS. 3 and 4 are sectional views of a mold for the production of articles according to the invention but particularly for the molding illustrated in FIG. 2. The apparatus consists of a two-part mold 30, having an upper part 31 and a lower part 32 which are split by a parting line 33. The mold parts are cavity molds such as are frequently used in the manufacture of expanded foam articles. The upper mold part 31 has a mold cavity 34 into which extends a passage 35 for the introduction of hot air, steam or cooling fluid. The lower mold part 32 has a cavity 36 into which extends a passage 37 also for the introduction of hot air, steam or cooling fluid. The two mold parts define therebetween a molding cavity 38. Interconnecting the mold cavity 34 and the molding cavity 38 is a steam port 39. Leading from the molding cavity 38 to the exterior are exhaust ports 40.

The process of the invention is as follows.

The two mold parts are preheated to a predetermined temperature which is dependent upon the characteristics of the plastic material to be used and of the article and of the many other factors involved. As is common practice in the art, it is necessary to determine the requirements by a largely trial and error basis in the first production runs. For preheating one can use hot air or steam introduced into the cavities 34 and 36. Then beads of the expandable material are introduced into the molding cavity and the mold closed. The beads may be as received from the manufacturer or they may be partly expanded. Which type of beads are used depends again on the article to be produced. The beads may be of a fire retardant type so as to produce a finished article for use in buildings where the use of fire-proof material is compulsory.

With the mold closed, steam is now introduced through the duct 35 into the cavity 34. This heats the mold part 31 and a certain amount of steam is introduced into the molding cavity 38 through the port 39. The heating effect from the mold part wall and from the steam in the chamber causes the beads within the molding cavity 38 to expand to fill the cavity. However, the lower mold part 32 is not heated during this stage. The result of this is that the beads in proximity to the surface of the cavity defined by the mold part 32 do not expand to the same degree as the remainder of the beads. This provides a region of higher density around the wall and surface portion. It will be noted that there is not a gradual diminishing of density from the surface of the mold part 32 to the surface of the mold part 31, but only a limited region adjacent the surface of mold part 32 which is of a higher density.

During the expansion stage of the process, reaction gases escape through the exhaust ports 40. If the mold parts are not a close fit, the gases may escape along the parting line 33 and exhaust ports are not necessary.

After the expansion has taken place, the mold is cooled by introducing cooling fluid through the ports 37 and 35. The mold is then broken open and the article removed.

After removal from the mold the article may be painted or have an adhesive affixed thereto or otherwise prepared for sale.

In an alternative process moisture can be included with the expandable beads introduced into the molding cavity. In this case the port 39 can be omitted. Also it is necessary to further heat both mold parts 31 and 32 to insure that the moisture is vaporized. However, the mold parts are heated to different temperatures to obtain the dense surface region adjacent the cooler mold part.

While the present invention has been described with reference to a particular embodiment, it should be understood that many alterations and modifications may be practiced by those skilled in the art without departing from the spirit and scope of the invention. Accordingly, it is to be understood that the invention is not to be limited to the above, but only as defined in the appended claims.

What is claimed is:

1. A process for manufacturing a molded plastic article comprising introducing expandable pellets of polystyrene into the mold cavity of a two-part mold, the first of said mold parts having a mold cavity wall for forming a supporting surface and the second of said mold parts having a mold cavity wall for forming a decorative surface, injecting a heating medium into said first mold part effecting expansion of said expandable pellets of polystyrene to fill said mold with expanded polystyrene foam, said heating medium heating said mold cavity wall of said first mold part below the temperature at which said expanding foam melts or softens, said mold cavity wall of said second mold part being heated to a lower temperature than said mold cavity wall of said first mold part so that the expanded decorative surface has a greater density than the expanded supporting surface.

2. The process of claim 1 in which said heating medium is steam.

3. The process of claim 1 in which a heating medium having a lower temperature than the temperature of said heating medium injected into said first mold part is injected into said second mold part.

4. The process of claim 3 in which the heating medium injected into said second mold part is steam.

5. The process of claim 3 in which moisture is present in said expandable pellets of polystyrene introduced into the mold cavity of said two-part mold.

* * * * *